(12) United States Patent
Schuster (10) Patent No.: US 7,652,668 B1
(45) Date of Patent: Jan. 26, 2010

(54) GAP CLOSURE IN A DRAWING

(75) Inventor: Michael D. Schuster, Woodside, CA (US)

(73) Assignee: Adobe Systems Incorporated, San Jose, CA (US)

( * ) Notice: Subject to any disclaimer, the term of this patent is extended or adjusted under 35 U.S.C. 154(b) by 379 days.

(21) Appl. No.: 11/109,507

(22) Filed: Apr. 19, 2005

(51) Int. Cl.
*G06T 11/20* (2006.01)

(52) U.S. Cl. ...................................... 345/441

(58) Field of Classification Search .............. 345/441
See application file for complete search history.

(56) References Cited

U.S. PATENT DOCUMENTS

| | | | | |
|---|---|---|---|---|
| 5,155,836 | A * | 10/1992 | Jordan et al. ............. | 703/23 |
| 5,182,709 | A * | 1/1993 | Makus .................... | 704/9 |
| 5,278,983 | A * | 1/1994 | Kawabe et al. ............ | 345/420 |
| 5,335,296 | A * | 8/1994 | Larkin et al. ............. | 382/298 |
| 5,694,536 | A * | 12/1997 | Gangnet et al. ........... | 345/442 |
| 5,847,711 | A * | 12/1998 | Kaufman et al. .......... | 345/424 |
| 5,991,466 | A * | 11/1999 | Ushiro et al. ............. | 382/305 |
| 6,049,339 | A * | 4/2000 | Schiller et al. ........... | 345/630 |
| 6,167,325 | A * | 12/2000 | Kamiguchi et al. ....... | 700/183 |
| 6,301,686 | B1 * | 10/2001 | Kikuchi et al. ........... | 716/2 |
| 6,373,490 | B1 * | 4/2002 | Bendiksen et al. ........ | 345/441 |
| 6,499,043 | B1 * | 12/2002 | Forcier ................... | 715/273 |
| 6,678,881 | B2 * | 1/2004 | Graham ................... | 717/116 |
| 6,727,906 | B2 * | 4/2004 | Lockeridge et al. ....... | 345/581 |
| 7,136,082 | B2 * | 11/2006 | Saund et al. ............. | 345/619 |
| 7,256,785 | B1 * | 8/2007 | Asente et al. ............. | 345/441 |
| 2001/0033289 | A1 * | 10/2001 | Graham ................... | 345/619 |
| 2002/0041387 | A1 * | 4/2002 | Miyake et al. ............ | 358/1.14 |
| 2003/0007018 | A1 * | 1/2003 | Seni et al. ................ | 345/864 |
| 2003/0079194 | A1 * | 4/2003 | Igarashi et al. ............ | 716/8 |
| 2004/0119724 | A1 * | 6/2004 | Hawksworth ............. | 345/626 |
| 2005/0116667 | A1 * | 6/2005 | Mueller et al. ............ | 315/312 |
| 2005/0123864 | A1 * | 6/2005 | Franklin .................. | 430/346 |
| 2005/0190991 | A1 * | 9/2005 | McCleese ................ | 382/294 |
| 2006/0082571 | A1 * | 4/2006 | McDaniel ................ | 345/419 |
| 2006/0232603 | A1 * | 10/2006 | Schuster et al. ........... | 345/619 |
| 2007/0065013 | A1 * | 3/2007 | Saund et al. ............. | 382/186 |

OTHER PUBLICATIONS

TicTacToon: a paperless system for professional 2D animation Jean-Daniel Fekete, Erick Bizouarn, Eric Cournarie, Thierry Galas, Frédéric Taillefer Sep. 1995 SIGGRAPH '95: Proceedings of the 22nd annual conference on Computer graphics and interactive techniques.*

Gangnet, M., Van Thong, J.-M., and Fekete, J.-D. 1994. Automatic Gap Closing for Freehand Drawing. ACM SIGGRAPH 94 Technical Sketch.*

* cited by examiner

*Primary Examiner*—Javid A Amini
(74) *Attorney, Agent, or Firm*—Van Pelt, Yi & James LLP (57) ABSTRACT

A technique for editing a drawing having an existing gap line is disclosed. The technique includes editing a path, marking the existing gap line as deleted, analyzing the drawing for gaps, detecting a detected gap, and generating a gap line that closes the detected gap.

31 Claims, 5 Drawing Sheets

GAP CLOSURE IN A DRAWING

BACKGROUND OF THE INVENTION

Figure 1A:
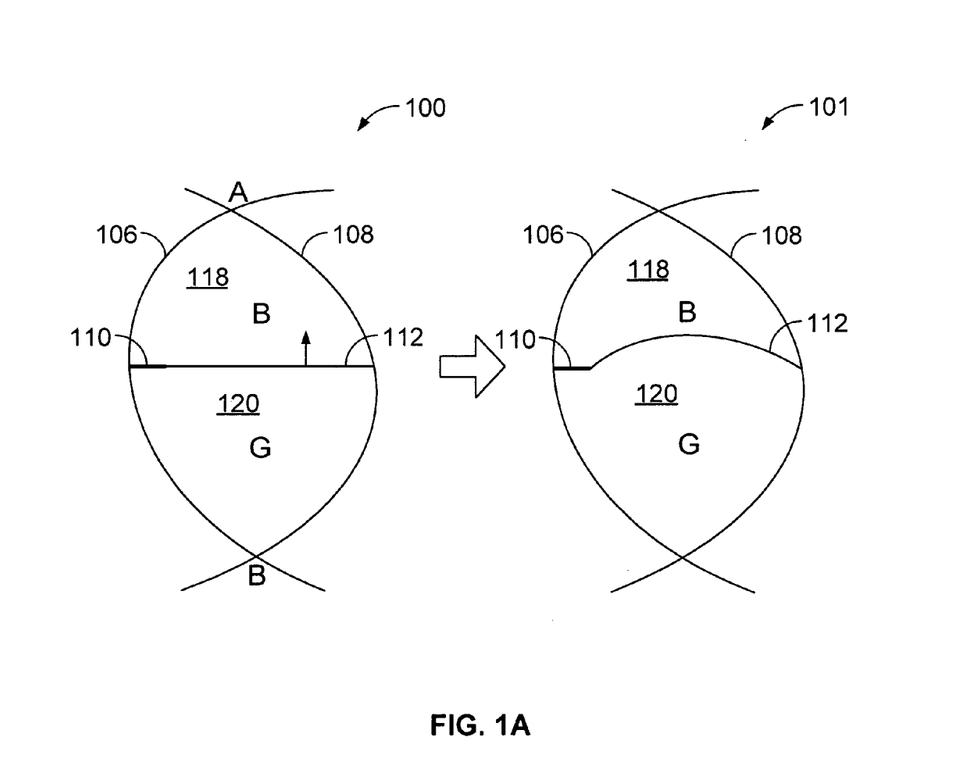
FIG. 1A illustrates a drawing before and after an edit.

Drawings are used to visually express ideas on the web, in print or in other media. Drawings can be created and edited in software using various drawing applications. A typical drawing includes a plurality of paths that form regions, each of which might be filled with a color. Sometimes a region is not completely bounded by paths on all sides. For example, there may be a gap between two paths that enclose the region. FIG. 1 illustrates a drawing before and after an edit. Drawing 100 is shown to includes three paths 106, 108, and 112 and a gap line 110. Paths 106 and 108 intersect at points A and B. Path 112 intersects path 108 and almost intersects path 106, except for a gap between the left endpoint of path 112 and path 106. Regions 118 and 120 are formed between paths 106 and 108 by path 112. When regions 118 and 120 are filled using a paint bucket tool, gap line 110 is generated to close the gap. In this example, region 118 is painted blue and region 120 is painted green. A user may then wish to shift path 112 upwards. The user might try clicking on path 112 with a mouse and dragging upwards, as shown by the dashed arrow. However, as shown, path 108 is stretched, rather than shifted. In addition, gap line 110 remains fixed. Drawing applications typically fix gap lines, making it difficult to edit a drawing that includes a gap line. An improved method of handling gap lines is needed. In particular, it would be desirable to have gap lines change when an edit is made.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1B:
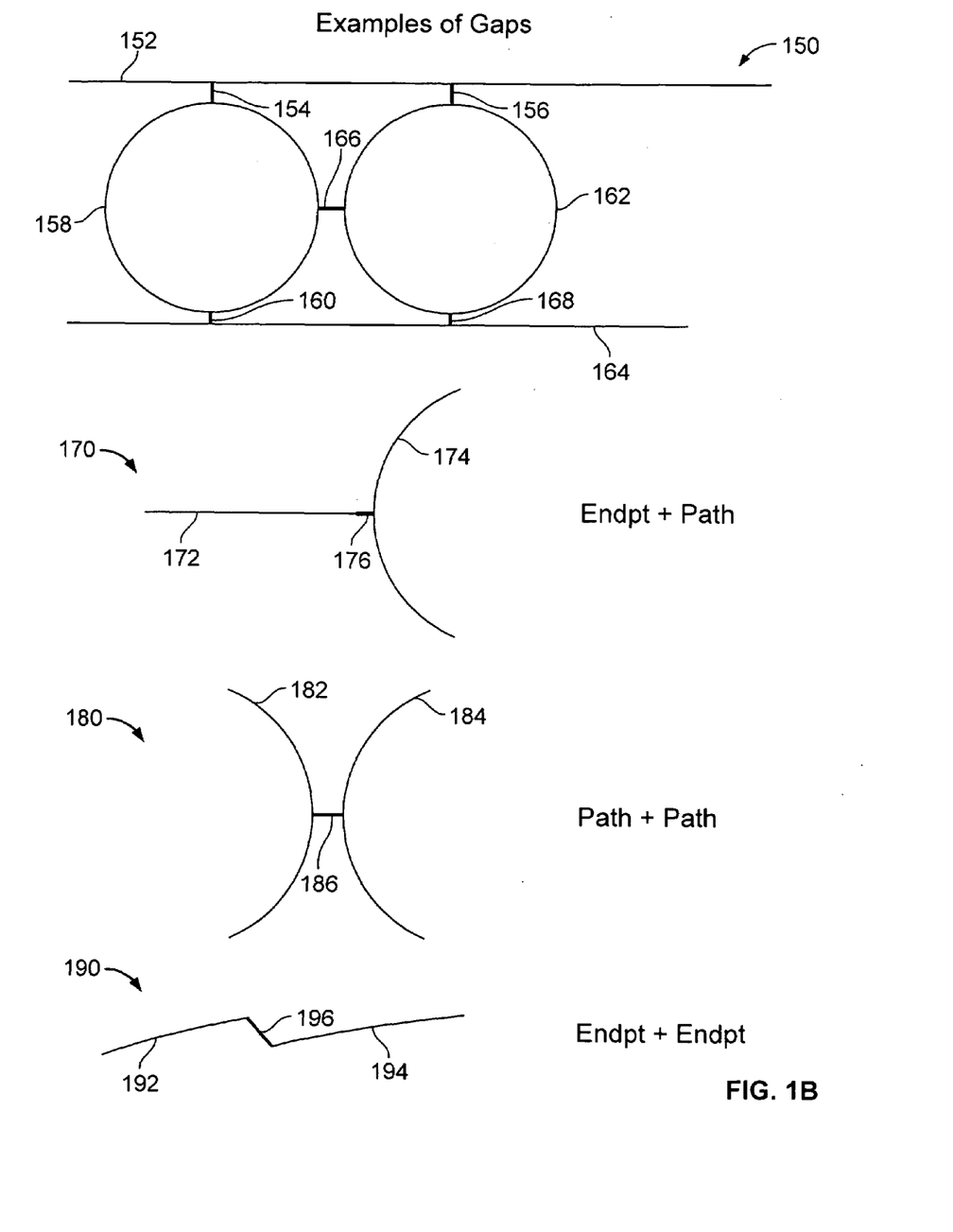
FIG. 1B is a drawing illustrating various examples of gaps.

When editing a drawing, existing gap lines are marked as deleted and the drawing is analyzed for gaps. New and/or existing gaps are detected. Gap lines are generated to close the detected gaps in the edited drawing. The generated gap lines could include new or existing gap lines. Region colors or other attributes can be associated with each side of the gap lines, as more fully described below FIG. 1B is a drawing illustrating various examples of gaps. Drawing 150 is shown to include four paths 152, 158, 162, and 164. Paths 158 and 162 are ellipses that almost touch each other tangentially except for a gap between the two paths. Gap line 166 closes the gap between the two ellipses. A gap line, as used herein, comprises one or more paths or subpaths that close a gap in a drawing. As such, a gap line can include a curve or a straight line. Path 152 is a line that almost touches paths 158 and 162. Gap line 154 closes the gap between paths 158 and 152. Gap line 156 closes the gap between paths 152 and 156. Path 164 is a line that almost touches paths 158 and 162. Gap line 160 closes the gap between paths 158 and 164. Gap line 168 closes the gap between paths 162 and 164.

Drawing 170 illustrates a gap between an endpoint and a path. In this example, the endpoint of path 172 almost touches path 174 except for a gap. Gap line 176 closes the gap between the endpoint of path 172 and path 174.

Drawing 180 illustrates a gap between two paths. In this example, path 182 and path 184 almost touch each other except for a gap. Path 182 and path 184 are curves that almost touch each other tangentially. Gap line 186 closes the gap between paths 182 and 184.

Drawing 190 illustrates a gap between two paths at their endpoints. In this example, the endpoint of path 192 and the endpoint of path 194 are separated by a gap 196. (As used herein, label numbers (e.g., 196) are used to denote both the gap and the gap line that closes the gap.) Gap line 196 closes gap 196 as shown.

Figure 2:
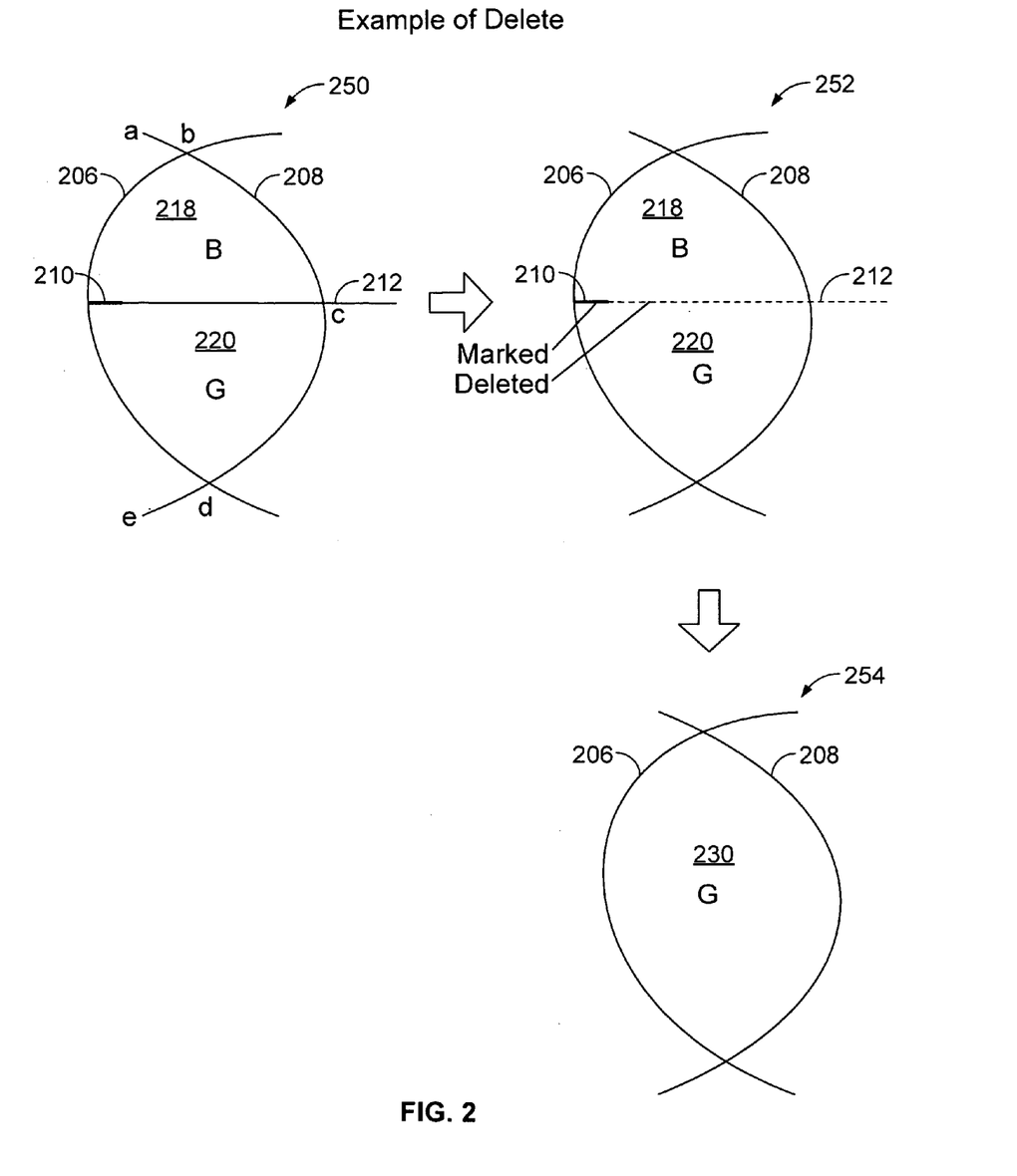
FIG. 2 illustrates a drawing during a delete process.

FIG. 2 illustrates a drawing during a delete process. In this example, initially, drawing 250 is shown. Drawing 250 is shown to include paths 206, 208, and 212 and gap line 210. Paths 206 and 208 intersect at points b and d. Path 212 intersects path 208 and almost intersects path 206, except for a gap between the left endpoint of path 212 and path 206. Gap line 210 is generated to close the gap. Regions 218 and 220 are formed between paths 206 and 208 by path 212 and gap line 210. A region, as used herein, can be bounded (finite area) or unbounded (infinite area). For example, a bounded region could be bounded by subpath(s) and/or path(s). For example, regions 218 and 220 are bounded regions. The region outside of regions 218 and 220 comprise an unbounded region. In some embodiments, gap line 210 is generated when regions 218 and 220 are filled (e.g., using a paint bucket tool). In this example, region 218 is painted blue and region 220 is painted green.

In some embodiments, path definitions of the paths in drawing 250 are stored in structures or objects in a database. The path definitions could be stored in an artwork representation that may be used for display or printing. In some embodiments, the artwork representation includes a list of path definitions. Each path definition includes definitions of subpaths of that path. A subpath, or edge, is a portion of a path between an intersection or endpoint and another intersection or endpoint of the path. For example, the endpoints of path 208 are a and e. The intersections of path 208 are b, c, and d. The endpoints and intersections of path 208 define the subpaths of path 208. The subpaths of path 208 are a->b, b->c, c->d, and d->e. A path with no intersections has one subpath.

In some embodiments, each subpath definition includes a sequence of color transitions for that subpath. The sequence of color transitions includes the region colors associated with each side of the subpath. For example, the sequence of color transitions for subpath b->c of path 208 include blue and lack of color. The (bounded) region to the left of subpath b->c is blue. The (unbounded) region to the right of subpath b->c is not associated with a color. Color, as used herein, refers to any attribute of a region, path, or subpath. In any of these examples, other attributes can be used, including, but not limited to, filling with color, absence of color, a pattern (e.g., hatching), a texture, a gradient, a portion of an image, or an abstract attribute, such as an identifier. For each path definition, an indication of whether the path was recently inserted, erased (marked for deletion), or invariant (did not change) could be stored. In some embodiments, a gap line is a path, and an indication of whether the path is a gap line is stored. The artwork representation is more fully described in U.S. patent application Ser. No. 11/109,495 entitled MODIFYING A PATH IN A DRAWING filed Apr. 19, 2005, which is incorporated herein by reference for all purposes.

A user may then decide to delete path 212. For example, the user could click on path 212 with a mouse and hit the delete key on a keyboard. In drawing 212, path 212 is marked as deleted, as indicated by the dashed line. For example, path 212 can be marked as deleted by indicating in its path definition that it is erased, as described above. In some embodiments, gap line 210 is automatically marked as deleted.

The drawing is analyzed for gaps. In this case, no gaps are found. In drawing 254, path 212 is deleted and paths 206 and 208 now enclose only one region 230. In some embodiments, the color of region 230 is determined based on a set of color assignment rules, as more fully described in MODIFYING A PATH IN A DRAWING, which was previously incorporated by reference. For example, the rules may specify that region 230 is assigned the color of region 218 or region 220, based on the relative areas of regions 218 and 220. If the area of region 218 is greater, then region 230 is assigned the color of region 218 (blue). If the area of region 220 is greater, then region 230 is assigned the color of region 220 (green).

Figure 3:
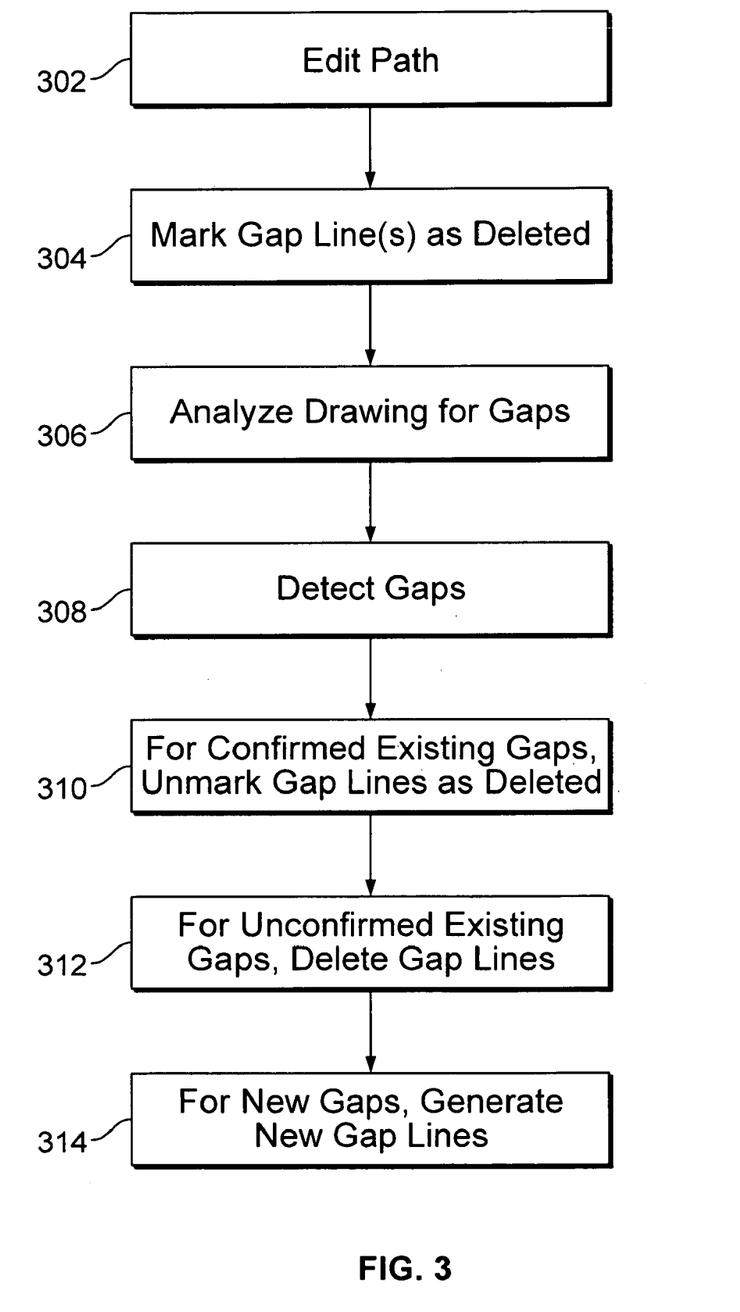
FIG. 3 is a flowchart illustrating an embodiment of a process for editing a drawing having a gap line.

FIG. 3 is a flowchart illustrating an embodiment of a process for editing a drawing having a gap line. For example, this process may be implemented when deleting path 212 from drawing 250, as shown in FIG. 2. In the example shown, a path is edited (302). Editing includes inserting, deleting, moving, rotating, coloring or modifying one or more paths, subpaths, or intersections in a drawing. An editing tool could be used to edit the drawing. For example, a mouse could be used to select a path, and then drag or rotate the path. The gap line is marked as deleted (304). For example, in FIG. 2, gap line 210 is marked as deleted. In some embodiments, all gap lines are marked as deleted. In addition, deleted line(s) are marked as deleted. For example, in FIG. 2, line 212 is also marked as deleted. The drawing is analyzed for gaps (306). Gaps are detected (308). Various criteria can be used to define gaps. For example, a gap can be defined as a location where a subpath is within a specified distance from the same or another subpath. Any appropriate gap detection method could be used. In some embodiments, gaps are detected as described by M. Gangnet in "Automatic Gap Closing for Freehand Drawing" (Siggraph 1994 Technical Sketch Submission). In some embodiments, gap detection is performed using planar sweeps, as more fully described in U.S. patent application Ser. No. 11/109,836 entitled GAP DETECTION IN A DRAWING filed Apr. 19, 2005, which is incorporated herein by reference for all purposes. In some embodiments, only the portion of the drawing affected by the path edit is analyzed rather than the whole drawing.

Detected gaps could include existing gaps and new gaps. Existing gaps are associated with gap lines that are marked as deleted, such as gap line 210. Existing gaps that are detected in (308) are referred to as confirmed existing gaps. Existing gaps that are not detected in (308) are referred to as unconfirmed existing gaps. For confirmed existing gaps, the gaps lines are unmarked as deleted (310). For example, the gap line can be unmarked as deleted by indicating in its path definition that it is not erased, as described above. For unconfirmed existing gaps, the gap lines are deleted (312). For example, in FIG. 2, line 212 is marked as deleted and the gap associated with gap line 210 is not detected in (308). Thus, gap line 210 closes an unconfirmed existing gap and is deleted. For new gaps, new gap lines are generated (314). New gaps are gaps that did not exist prior to the edit.

In some embodiments, colors are assigned to the gap lines based on a set of color assignment rules. In some embodiments, each gap line definition includes a sequence of color transitions for that gap line and the color of the gap line. For example, the sequence of color transitions could include the color of the region on one side of the gap line and the color of the region on the other side of the gap line. In some embodiments, the color assignment rules state that when confirming an existing gap line, the color transitions (region colors) and gap line color remain the same. When generating a new gap line, region and gap line colors are assigned based on the colors of one of the paths touching the gap line. Any appropriate color assignment rules can be used. In some embodiments, colors are assigned arbitrarily.

Figure 4:
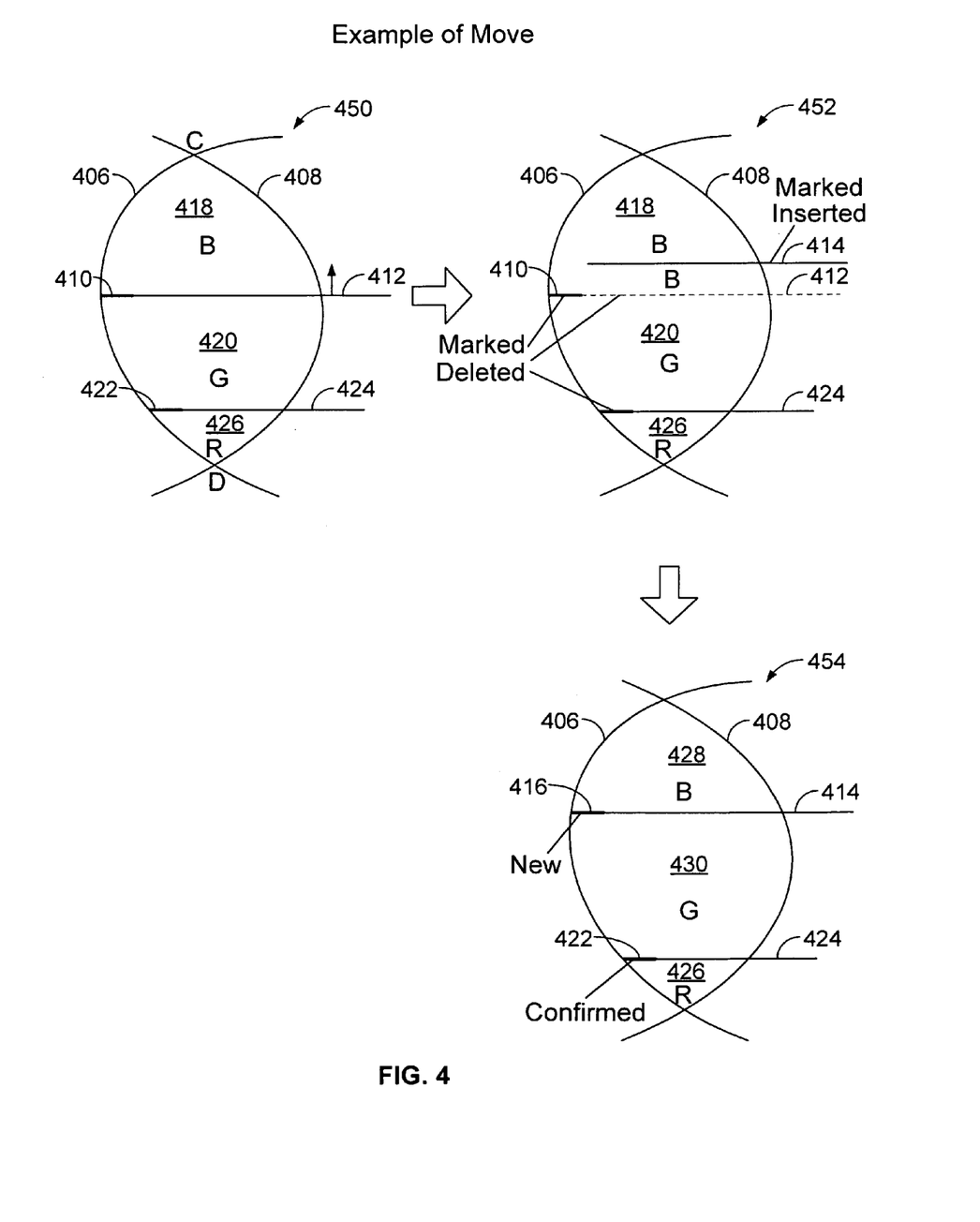
FIG. 4 illustrates a drawing as a path is moved.

FIG. 4 illustrates a drawing as a path is moved. In this example, initially drawing 450 is shown. Drawing 450 is shown to include paths 406, 408, 412, and 424, and gap lines 410 and 422. Paths 406 and 408 intersect at points C and D. Path 412 intersects path 408 and almost intersects path 406 except for a gap between the left endpoint of path 412 and path 406. Path 424 intersects path 408 and almost intersects path 406 except for a gap between the left endpoint of path 424 and path 406. Gap line 410 is generated to close the gap between path 412 and path 406. Gap line 422 is generated to close the gap between path 424 and path 406. Regions 418, 420, and 426 are formed between paths 406 and 408 by paths 412 and 424 and gap lines 410 and 422. In some embodiments, the gap lines are generated when the regions are filled (e.g., using a paint bucket tool). In this example, region 418 is painted blue, region 420 is painted green, and region 426 is painted red. In some embodiments, path definitions of the paths in drawing 450 are stored, for example, in structures or objects in a database, as described above.

A user may then decide to move path 412 upwards, as shown by the dashed arrow. For example, the user could click on path 412 with a mouse to select it, then drag path 412 upwards with the mouse. The user could also click on path 412 to select it, then hit the up arrow key on a keyboard to shift path 412 upwards. In drawing 452, path 412 is marked as deleted, as indicated by the dashed line. For example, path 412 can be marked as deleted by indicating in its path definition that it was marked for deletion, as described above. In addition, gap line 410 is marked as deleted. New path 414 is inserted and is the shifted version of path 412. New path 414 is marked inserted.

The drawing is analyzed for gaps. In this case, new gap 416 is found, existing gap 410 is unconfirmed, and existing gap 422 is confirmed. In drawing 454, path 414 becomes shifted path 412 and paths 406 and 408 now enclose original region 426 and modified regions 428 and 430. New gap line 416 is generated to close gap 416. In some embodiments, the gap lines are visible to a user viewing the drawing. For example, gap lines 416 and 422 could be red and bold in color.

In some embodiments, the colors of regions 428 and 430 are determined based on a set of color assignment rules, as more fully described in MODIFYING A PATH IN A DRAWING, which was previously incorporated by reference. In some embodiments, the region colors assigned to existing gap line 422 are the same as prior to the edit (green above, red below). In addition the gap line color is the same as prior to the edit (black). The region colors assigned to new gap line 416 are the same as the region colors assigned to path 414 (blue above, green below). In addition, the gap line color is the same as the color of path 414 (black).

In this example, a move includes inserting a new path, marking an original path as deleted, and then deleting the original path. The move does not necessarily need to be decomposed into an insert and a delete. A move could be implemented in various ways in various embodiments.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
   receiving an indication that a path associated with a pre-existing gap line in a drawing has been edited, wherein the pre-existing gap line closes a gap in the drawing;
   marking the pre-existing gap line as deleted;
   analyzing the edited drawing to detect gaps, including determining whether any detected gaps are closed by the pre-existing gap line;
   in the event that it is determined that a detected gap is closed by the pre-existing gap line, unmarking the pre-existing gap line as deleted; and
   in the event that it is determined that a detected gap is not closed by the pre-existing gap line, deleting the pre-existing gap line;
   wherein analyzing the edited drawing is performed by a processor.

2. A method as recited in claim 1, further including storing the gap line.

3. A method as recited in claim 1, wherein the detected gap is a pre-existing gap.

4. A method as recited in claim 1, further including deleting the pre-existing gap line.

5. A method as recited in claim 1, wherein the detected gap is a new gap.

6. A method as recited in claim 1, further including associating region attributes with each side of the gap line.

7. A method as recited in claim 6, wherein at least one of the region attributes is associated with an unbounded region.

8. A method as recited in claim 1, wherein the gap line connects a subpath at a location where the subpath is within a specified distance from the same or another subpath.

9. A method as recited in claim 1, wherein the gap line connects a subpath at a location where the subpath is within a specified distance from the same or another subpath and wherein the subpath includes region attributes for each side of the subpath.

10. A method as recited in claim 1, wherein the gap line connects a subpath at a location where the subpath is within a specified distance from the same or another subpath and wherein the subpath includes region attributes for each side of the subpath, and further including assigning region attributes to each side of the gap line based on the region attributes of the subpath.

11. A method as recited in claim 1, wherein the gap line connects a subpath at a location where the subpath is within a specified distance from the same or another subpath and wherein the path includes the subpath.

12. A method as recited in claim 1, wherein the gap line includes a path or a subpath.

13. A method as recited in claim 1, wherein the gap line is visible to a user viewing the drawing.

14. A method as recited in claim 1, wherein analyzing includes analyzing a portion of the drawing affected by the path edit without analyzing the whole drawing.

15. A method as recited in claim 1, wherein the gap line includes a curve.

16. A method as recited in claim 1, wherein the gap line closes a region.

17. A method as recited in claim 16, wherein the region is filled with a color.

18. A method as recited in claim 1, wherein marking the pre-existing gap line as deleted comprises indicating that the pre-existing gap line is marked deleted in a path definition associated with the pre-existing gap line.

19. A method as recited in claim 1, wherein the pre-existing gap line is marked as deleted without deleting a path definition associated with the pre-existing gap line.

20. A method as recited in claim 1, further including:
   in the event that a gap not associated with the pre-existing gap line is detected, generating a gap line that closes the detected gap.

21. A method as recited in claim 1, further including:
   in the event that no gap associated with the pre-existing gap line is detected, deleting the pre-existing gap line.

22. A method as recited in claim 21, wherein deleting the pre-existing gap line comprises deleting a path definition associated with the pre-existing gap line.

23. A method as recited in claim 1, wherein the pre-existing gap line is a path that was automatically generated to create a region that is completely bounded by paths on all sides.

24. A system comprising:
   a processor configured to:
      receive an indication that a path associated with a pre-existing gap line in a drawing has been edited, wherein the pre-existing gap line closes a gap in the drawing;
      mark the pre-existing gap line as deleted;
      analyze the edited drawing to detect gaps, including determining whether any detected gaps are closed by the pre-existing gap line;
      in the event that it is determined that a detected gap is closed by the pre-existing gap line is, unmark the pre-existing gap line as deleted; and
      in the event that it is determined that a detected gap is not closed by the pre-existing gap line, delete the pre-existing gap line;
   a memory coupled with the processor, wherein the memory provides the processor with instructions.

25. A system as recited in claim 24, wherein the detected gap is a pre-existing gap.

26. A system as recited in claim 24, further including deleting the pre-existing gap line.

27. A system as recited in claim 24, wherein the detected gap is a new gap.

28. A system as recited in claim 24, further including associating region attributes with each side of the gap line.

29. A system as recited in claim 24, wherein the gap line is visible to a user viewing the drawing.

30. A system as recited in claim 24, wherein analyzing includes analyzing a portion of the drawing affected by the path edit without analyzing the whole drawing.

31. A computer program product, the computer program product being embodied in a computer readable storage medium and comprising computer instructions for:

receiving an indication that a path associated with a pre-existing gap line in a drawing has been edited, wherein the pre-existing gap line closes a gap in the drawing;

marking the pre-existing gap line as deleted;

analyzing the edited drawing to detect gaps, including determining whether any detected gaps are closed by the pre-existing gap line;

in the event that it is determined that a detected gap is closed by the pre-existing gap line, unmarking the pre-existing gap line as deleted; and     in the event that it is determined that a detected gap is not closed by the pre-existing gap line, deleting the pre-existing gap line.

\* \* \* \* \*

UNITED STATES PATENT AND TRADEMARK OFFICE
CERTIFICATE OF CORRECTION

PATENT NO. : 7,652,668 B1
APPLICATION NO. : 11/109507
DATED : January 26, 2010
INVENTOR(S) : Michael D. Schuster It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 482 days.

Signed and Sealed this

Twenty-third Day of November, 2010

David J. Kappos
*Director of the United States Patent and Trademark Office*